US010103591B2

(12) United States Patent
Heins

(10) Patent No.: US 10,103,591 B2
(45) Date of Patent: Oct. 16, 2018

(54) GENERATOR AND IMPROVED COIL THEREFOR HAVING ELECTRODYNAMIC PROPERTIES

(71) Applicant: Thane C. Heins, Almonte (CA)

(72) Inventor: Thane C. Heins, Almonte (CA)

( * ) Notice: Subject to any disclaimer, the term of this patent is extended or adjusted under 35 U.S.C. 154(b) by 842 days.

(21) Appl. No.: 14/059,775

(22) Filed: Oct. 22, 2013

(65) Prior Publication Data
US 2014/0111054 A1    Apr. 24, 2014

Related U.S. Application Data

(60) Provisional application No. 61/717,767, filed on Oct. 24, 2012.

(51) Int. Cl.
| *H02K 1/00* | (2006.01) |
| *H02K 3/00* | (2006.01) |
| *H02K 53/00* | (2006.01) |
| *H02K 99/00* | (2014.01) |

(52) U.S. Cl.
CPC .............. *H02K 3/00* (2013.01); *H02K 53/00* (2013.01); *H02K 99/10* (2016.11)

(58) Field of Classification Search
CPC ........ H02K 3/00; H02K 53/00; H02K 57/003; H02K 99/10; H02K 99/20; H02K 3/02
USPC ...................... 310/195, 208–213; 74/DIG. 9
See application file for complete search history.

(56) References Cited

U.S. PATENT DOCUMENTS

| 3,076,153 | A | * | 1/1963 | Rieckman | .............. | H02K 33/18 |
| | | | | | | 310/22 |
| 3,482,156 | A | * | 12/1969 | Porath | .................... | H02K 29/10 |
| | | | | | | 310/156.13 |
| 3,504,255 | A | * | 3/1970 | Esperance | ............... | H02P 23/10 |
| | | | | | | 318/814 |
| 3,638,155 | A | * | 1/1972 | Combs | .................... | H01F 38/08 |
| | | | | | | 336/205 |
| 4,675,591 | A | * | 6/1987 | Pleiss | ........................ | H02P 1/32 |
| | | | | | | 310/184 |
| 4,733,113 | A | * | 3/1988 | Smith | .................... | H02K 37/18 |
| | | | | | | 310/49.33 |
| 4,910,790 | A | * | 3/1990 | Kershaw | ............... | H02K 23/36 |
| | | | | | | 310/136 |

(Continued)

FOREIGN PATENT DOCUMENTS

WO    WO 2008067649 A2 *  6/2008  ............. H02K 53/00

OTHER PUBLICATIONS

Lenz's law. In Encyclopædia Britannica. Retrieved from http://www.britannica.com/science/Lenzs-law.*

*Primary Examiner* — Thanh Lam
(74) *Attorney, Agent, or Firm* — Leslie Virany

(57) ABSTRACT

The present invention relates to electrical generators and, in particular, to improvements to efficiency in electromechanical energy conversion in electrical generators and electric motors. The regenerative acceleration generator coil according to the present invention takes advantage of the structure of a high impedance multiple-loop salient pole winding or low impedance bi-filar windings to create a positive armature (accelerative) reaction rather than a negative (decelerative) reaction as exhibited by prior art generators which only have low impedance multiple loops of wire making up their rotor armature. The generator of the present invention reverses these negative effects by delaying current flow in the coil until the rotating magnetic field reaches TDC.

20 Claims, 11 Drawing Sheets

(56) References Cited

U.S. PATENT DOCUMENTS

| | | | | |
|---|---|---|---|---|
| 4,912,692 A | * | 3/1990 | Kamens | G04C 3/14 |
| | | | | 318/696 |
| 5,099,165 A | * | 3/1992 | Ackermann | H02K 29/03 |
| | | | | 310/156.31 |
| 8,040,012 B2 | | 10/2011 | Meinke | |
| 2004/0227486 A1 | * | 11/2004 | Kerlin | H02P 7/28 |
| | | | | 318/807 |
| 2005/0269892 A1 | * | 12/2005 | Duff, Jr. | H02K 17/185 |
| | | | | 310/212 |
| 2007/0007844 A1 | * | 1/2007 | Barbat | H02K 53/00 |
| | | | | 310/208 |
| 2009/0079200 A1 | * | 3/2009 | Gieras | H02K 35/06 |
| | | | | 290/1 R |

* cited by examiner

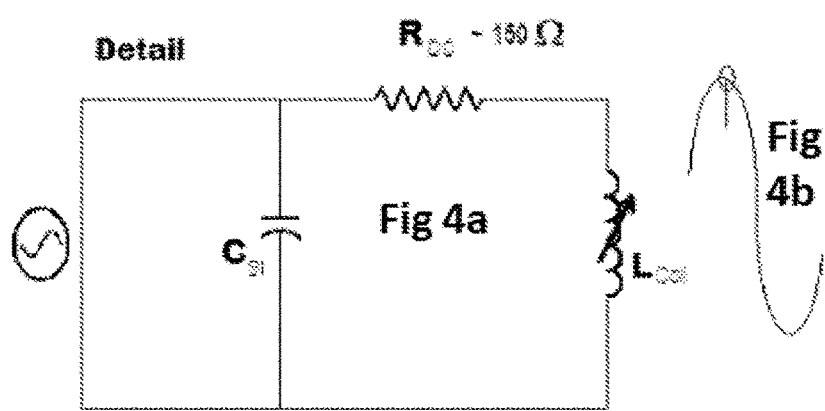

GENERATOR AND IMPROVED COIL THEREFOR HAVING ELECTRODYNAMIC PROPERTIES

The present invention relates to electrical generators and, in particular, to improvements to efficiency in electromechanical energy conversion in electrical generators and electric motors.

BACKGROUND OF THE INVENTION

Faraday's Law governs induction in the motion of a closed current bearing conducting loop through a magnetic field. This law is formulated, in simple terms, in regard to the motion of such a loop across the field lines of a uniform magnetic field, which is not the case when multiple loops are in close proximity to one another and are rotating through a field inside a generator.

Many applications of known motor control theory have developed to adjust or compensate for this negative unwanted (armature reaction) departure from the simple case.

Lenz's Law is a law of physics which governs the conventional coil's resistive and decelerative armature reaction and is an extension of Newton's Third Law which states that, "for every action there is an equal and opposite reaction.

Where electric generators are concerned this applies when a conducting loop is moved through a magnetic field and said loop is connected to a load such that electric current flows in the closed loop circuit.

This electric current flow produces a magnetic field around the loop which creates a counter-electromotive torque which impedes the loop's progress through the magnetic field.

Additional external torque must therefore be applied to the rotation of the loop to keep it moving through the magnetic field or rotation will cease and power delivered to the load will also cease.

The magnitude of the generator's induced resistive magnetic field around the loop is directly proportional to the magnitude of current flowing in the loop and to the load.

It is also important to note that the generator coil's induced repelling magnetic field (equal and opposite reaction) is simultaneous and in an identical time frame to the action causing it i.e. the approaching magnetic field which produces the induced voltage in the coil as well as the current flow and external magnetic field.

The load resistance that is connected to the loop plays an important role in dictating how much current can flow through the loop.

No current flows with an infinite resistance, no-load condition and maximum current flows with an infinite load, short circuit condition.

Variations of load magnitude vary the current flow through the loop and dictate what magnitude of external torque increase must be applied to overcome the loop's armature reaction (internally-induced electromagnetic resistance).

When a generator is operating in a no-load condition and rotating at a specified speed, a voltage is being induced in the generator's coils but there is an open circuit, infinite resistance connected to the loop and the loop rotates freely through the magnetic field because no current can flow through it and no armature reaction is created and minimum external torque must be applied to the loop to keep it rotating.

When an on-load resistive load is connected to the loop, current begins to flow in the loop and a decelerative armature reaction results in which a self-induced resistive electromagnetic counter-electromotive torque is produced.

This requires additional torque to be supplied to the loop to sustain power to the load and to overcome the counter-electromotive torque created by the loop's induced magnetic field which opposes the loop's rotation inside the magnetic field.

Multiple loads connected to generators are connected in parallel with the cumulative total approaching an infinite load/short circuit/maximum current flow/maximum armature reaction condition as described by Ohm's Law where:

$$R_{total}=1/R_1+1/R_2+1/R_3+ \ldots 1/R_n$$

Loads vary with regard to the phase angle differential (power factor) that they create between the voltage and current sine waves where the maximum load power factor is created by a worst case scenario of a purely resistive load and a power factor of 1 or voltage and current in phase with one another.

All load applications implied herein pertain to the worst case scenario and are of a purely resistive nature transferring maximum power form the generator to the load.

Faraday's Law and Lenz's Law apply equally to a cage wound rotor (loop) rotating through a uniform stationary magnetic field (or vice versa) and a salient pole round stator coil with an externally rotating magnetic field (or vice versa). This invention applies to both cases.

The Regenerative Acceleration Generator (ReGen-X) coil according to the present invention, takes advantage of the structure of a high impedance multiple-loop salient pole winding or low impedance bi-filar windings to create a positive armature (accelerative) reaction rather than a negative (decelerative) one as per all typical generators which only have low impedance multiple loops of wire making up their rotor armature.

All conventional generators operate as inductors and electromagnets when supplying power to a load. As inductors they store energy in the external electromagnetic field around the coil, and as electromagnets they simultaneously create a counter-electromagnetic-torque (armature reaction) which always opposes the generators rotating magnetic field direction and always in the same time domain.

As electromagnets, the conventional generator coil produces a magnetic field with the same polarity and in the same time domain as the approaching magnetic field which in turn instantly resists the rotor's approaching magnetic field and resists its departure equally vigorously when the current in the coil changes direction and the coil's magnetic field polarity is reversed.

For all intents and purposes, the duty cycle of current flow in a conventional generator coil is 360 degrees, meaning it is always flowing [except very briefly at Top Dead Centre (TDC) when falls to zero very briefly before it changes direction] and producing resistive internal forces.

For example when the rotor's North magnetic pole approaches the conventional generator coil the voltage induced in the coil increases which in turn increases the current flowing through the load which in turn increases the coil's induced repelling North pole magnetic field/armature reaction. See FIGS. 8 *a,b,c,d*.

SUMMARY OF THE INVENTION

The Regenerative Acceleration (ReGen-X) Generator coil takes advantage of the structure of the multiple-coil salient pole winding by utilizing specially wound wire coil configurations to store potential energy internally and electrostatically briefly inside the coil as voltage rather than externally and instantaneously in the electromagnetic field as per a conventional generator coil.

It is the conventional generator coil's induced resistive electromagnetic field that manifests itself instantly between the generator coil and the approaching rotor magnet which is responsible for the negative deceleration effects created by all typical generators when supplying power to a load.

Reducing or even eliminating this negative effect would have an overall benefit of increasing the generator's efficiency by mitigating the internally created electromagnetic resistance and reducing the additional external torque (and energy) which is always required to overcome it.

The ReGen-X does not reduce or eliminate these negative effects but reverses them instead by delaying current flow in the coil until the rotating magnetic field reaches TDC.

In comparison to the conventional coil design which employs large gauge windings with the aim of minimizing losses within the coil (q.v.) the ReGen-X coil can use relatively small gauge wire, which leads to many more turns being used in a ReGen-X coil than in a conventional coil.

A bi-filar wound coil may also be employed which reduces the turns ratio and coil's internal resistance to that closely resembling a conventional coil. If a non bi-filar generator coil winding is employed a step down transformer may also be required.

One consequence of both of these coil winding techniques/design characteristics is to raise the self-induced capacitance of the coil while modifying its higher excitation-frequency behavior (as described in further detail below) to create a delayed and accelerative armature reaction.

At TDC an approaching magnetic field is as close as it is going to get to a generator coil's core and it is at this position that the maximum voltage or electro-motive-force (EMF) is induced in the coil.

When the coil is connected to a load in an on-load condition, the result is maximum current flow and maximum electromagnetic field energy stored externally around the coil, with maximum electromagnetic resistance being produced.

This necessitates a maximum additional torque and work to be supplied externally by the prime mover if system deceleration avoidance is desired. Also at TDC, the induced current in the coil is changing direction and the repelling magnetic field changes polarity to a maximum magnitude attractive magnetic field which opposes the rotor magnet's departure away from the coil's core, again necessitating additional externally applied torque and power to keep the rotating magnetic field moving away without deceleration.

If the current flow in the conventional generator coil can be delayed until TDC or even after it as per the ReGenX coil then Lenz's Law, Newton's Third Law and the Law of Conservation of Energy no longer apply in the simple manner as expected to the operation of the conventional coil because their foundations are based on unrestricted and continuous current flow in the same time domain.

If current flow can be delayed until after TDC, Lenz's Law can even provide a reversed accelerative on-load effect, with respect to that which is commonly expected with the decelerative on-load effect. (For the purposes of this discussion typical time delays regarding core hysteresis do not apply). If current flow in the generator coil can be delayed until after the rotating magnetic field has already moved past the coil's core at TDC, the rotor's magnetic field can approach the coil unimpeded and without the effects normally prescribed to it by the usual application of Lenz's Law (i.e an equal and opposite resistive reaction in the same time domain) to generator behavior because this simple interpretation of Lenz's Law's operation is dependent on continuous current flow in a generator coil and an instantaneous repelling magnetic field.

The premise behind the operation of the Regenerative Acceleration Generator (ReGen-X) coil is that the generator coil's delayed current flow and subsequent delayed electromagnetic field can assist (rather than resist) the generator rotor's rotating magnetic field's approach to the generator coil and departure away from the generator coil by delaying current flow in the coil until after TDC by 45 degrees when compared to a conventional generator coil. The ReGen-X coil operation is similar to that of a capacitor where energy is stored internally in the electrostatic field inside the coil between the wires rather than in the external magnetic field as per a conventional generator coil which operates as an inductor.

This internally-stored, delayed and then instantaneously released magnetic field is responsible for the ReGen-X generator coil's accelerating and assistive force and Lenz's Law reversal when supplying power to a load.

Embodiments of the present invention are based on this observation and many further refinements will become apparent as described in detail below.

BRIEF DESCRIPTION OF THE DRAWINGS

FIG. 4: The coil of FIG. 4a produces an AC pulse, shown in FIG. 4b, at Top Dead Center. (TDC)

BRIEF DESCRIPTION OF THE INVENTION

Figure 3:
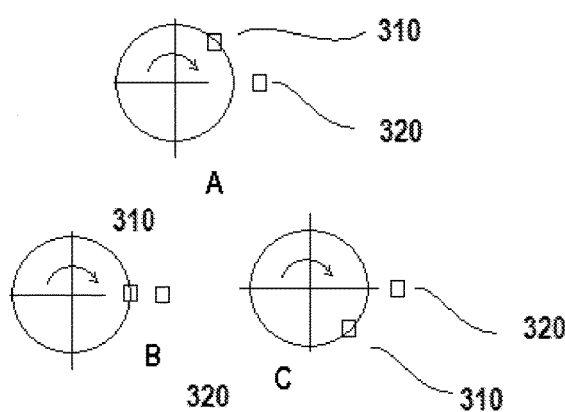
FIG. 3: A Rotating Magnetic Field Approaching a Stationary Stator Coil, TDC to that Coil and Moving Past said Coil.

The moment when the equivalent rotating magnet representing the coil 310 is neither approaching nor receding from the stator magnet/coil 320 is referred to as 'top dead center' or TDC as shown in FIG. 3. At TDC the maximum potential energy (EMF/voltage) is induced in the generator coil. At TDC, the generator's rotating magnetic field is neither approaching nor receding from the coil and as far as the generator coil's inductive reactance is concerned (AC resistance to current flow) it is zero. However, the instant just prior to TDC, maximum current is flowing in the coil and maximum electromagnetic resistance is being produced.

As the generator's rotor transitions though TDC, it moves through a region of maximum coil-induced, repelling electromagnetic resistance (rotor magnet approaching just prior to TDC) to zero induced electromagnetic resistance (directly at TDC) to maximum induced attractive or resistive electromagnetic field as the rotor magnet attempts to move away from just past TDC.

This is depicted in FIGS. 8 a,b,c,d at the apex of the sine wave at the TDC position (AC current sine wave apex). The current flow in the coil must cease at TDC just prior to moving in the other direction, not unlike the action of a pendulum. When the current flow ceases, the resistive forces produced by the coil and the effects usually expected as a consequence of Lenz's Law also must cease because they rely on current flow to exist and manifest themselves.

In a generator coil at TDC, the normal consequences of Lenz's Law are suspended and therefore many limitations to the present system normally expected from Newton's Third Law are suspended because current flow in the coil stops just prior to changing direction post-TDC where all the expected rules of generator dynamics resume functioning. While current flow in the conventional coil ceases at TDC the effects are not manifested due to the conventional coils' time constant.

In the conventional generator coil, current flow ceases at TDC but in the ReGen-X coil maximum current flow exists because at TDC, the AC impedance of the coil is at its minimum, and the induced voltage in the coil is at its maximum. At TDC, the maximum induced voltage in the ReGen-X coil can be dissipated through the coil via current flow which creates a maximum delayed magnetic field of maximum magnitude having the same repelling polarity as the now receding rotor magnetic field and an attracting polarity to the opposite approaching magnetic pole on the rotor.

When compared to a conventional generator coil where the maximum repelling magnetic field occurs just prior to TDC and just post TDC the ReGenX generator coil's maximum repelling magnetic field occurs at 45 degrees past TDC. In essence the rotor's magnetic field is already past the coil's core and already moving away when current flow and repelling magnetic field peak and assist its departure.

The inventor of the present generator has observed that all prior art generators exhibit the behavior (see FIG. 4*b*) in that the rotating loop, in the close (in the angular sense) neighbourhood parallel to the field lines of the external, or stator, field, exhibit no inductive behavior whatsoever because no magnetic field lines are being cut. In such a neighborhood, hereinafter referred to as 'top dead center' or TDC, the flow of current in the loop ceases with respect to the conventional coil, just prior to changing direction and thus the Lenz effects have no consequence. The coil's impedance to current flow is only governed by the DC resistive behavior of the loop of wire and the resistance of the load connected to the loop. Where the ReGen-X coil is concerned, however, maximum current flows because the otherwise highly restrictive impedance to current flow is minimized. At TDC the rotating magnetic field is neither approaching nor receding and at this moment the total coil inductive reactance drops to zero and the total impedance of the coil drops to the low DC resistance of the coil because the total coil impedance is determined by frequency of operation as shown below.

Total Inductive Reactance ($X_L$) of a Generator Coil:

$$X_L = 2\pi FL$$

where: $X_L$ is the total inductive reactance
F is the operating frequency of the coil
L is the inductance of the coil As can be deduced from the above equation, as the operating frequency of the coil is increased, the coil's inductive reactance must also increase.

Total Impedance ($Z_T$) of a Generator Coil:

$$Z_T = X_L + R_{DC} + X_C$$

where: $X_L$ is the total inductive reactance of the coil
$R_{DC}$ is the DC resistance of the coil windings
$X_C$ is the capacitive reactance of the coil As can be deduced from the above equation, as the inductive reactance of the coil is increased, the total impedance of the coil must also increase.

If we employ Ohm's Law which states that:

$$I = V/ZT$$

We can deduce that, as the coil impedance increases, the current flow decreases accordingly.

At TDC with regards to the ReGen-X COIL, $V_{induced}$ is maximum, $Z_T$ is minimum, I is maximum and the coil's induced magnetic field is also maximum. With regards to a conventional generator coil, current I is zero at TDC because at that exact moment it is changing direction, but maximum just prior and just post TDC. At TDC the induced voltage in any generator coil is maximum. Consequently, maximum voltage and lowest coil impedance coexist simultaneously at certain points during the AC cycle of the present invention.

Generators of the prior art all do this but the behavior is not noticeable because coil impedance is designed to be minimized.

At TDC, the ReGen-X coil's delayed maximum magnitude magnetic field pushes away on the now already receding rotor magnet, while attracting the next approaching opposite pole magnet on the rotor.

1. The present invention is a generator coil with sufficient inductance, impedance and self-induced capacitance when operated at a sufficient frequency which will, in the regions prior to TDC, disallow current to flow in the coil or to store energy externally around the coil in the electromagnetic field as an inductor, but will force the coil to store useful energy internally in the electrostatic field capacitively.

At the moment of TDC, this maximum internally-stored energy is released as a magnetic field of identical polarity to the receding rotor magnetic field with its full instantaneous force being exerted upon the magnet pole at the 45 degree mark because the coil's capacitively stored voltage and resultant current flow takes time due to the ReGenX coil's time constant.

Five known benefits result:
i. The receding magnetic field is accelerated away from the coil faster than it otherwise would be.
ii. The next opposite magnetic pole on the rotor is attracted to the coil by the additional force.
iii. Electric current delivers power to the load.
iv. The energy required to be delivered by the prime mover decreases accordingly.
v. More power can be delivered by the ReGen-X coil over a conventional coil without overheating danger because the ReGen-X coil's duty cycle has been significantly reduced and the coil has time to dissipate heat between the AC current pulses.

The ReGen-X coil has more than six different modes of operation which can be employed at any time and in any combination with a plurality of coils via electronic or manual switching of the coil configurations such as:
i. Parallel wound, parallel connected bi-filar wound motor coil.
ii. Parallel wound, series connected bi-filar wound motor coil.
iii. Parallel wound, parallel connected bi-filar wound conventional (system decelerating) coil.
iv. Parallel wound, series connected bi-filar wound ReGen-X (system accelerating) coil.
v. High Impedance ReGen-X coil.
vi. Any of the above employed in concert with a step up or step down transformer.

ReGenX Coil Flux Harvesting

2. In a further embodiment, when operated as a plurality of salient or independent coils, subject to particular positioning of the coils, (as described in greater detail below) the discharging flux from the ReGen-X coil can be collected into the adjacent coils operating as ReGen-X coils or conventional coils and the net flux in the coils is additive, including the rotor flux plus the induced flux from other coils, comprising a mode hereinafter referred to as flux harvesting.

3. In yet another embodiment of the present invention, flux harvesting as described above also applies in a ReGen-X coil adjacent to a motor coil such that the discharging magnetic field form the motor coil can be collected in the ReGen-X coil and the net power consumption by the motor coil reduced significantly. Information in the appendix attached hereto provides an explanation of why an inductor behaves as a capacitor at certain frequencies.

An ideal inductor would not behave like a capacitor, but in the real world there are no ideal components. Basically, any real inductor can be thought of an ideal inductor that has a resistor in series with it (wire resistance) and a capacitor in parallel with it (parasitic capacitance). Now, where does the parasitic capacitance come from? an inductor is made out of a coil of insulated wire, so there are tiny capacitors between the windings (since there are two sections of wire separated by an insulator). Each section of windings is at a slightly different potential (because of wire inductance and resistance). As the frequency increases, the impedance of the inductor increases while the impedance of the parasitic capacitor decreases, so at some high frequency the impedance of the capacitor is much lower than the impedance of the inductor, which means that the inductor behaves like a capacitor. The inductor also has its own resonance frequency. This is why some high frequency inductors have their windings far apart—to reduce the capacitance.

Capacitors have two conductive plates separate by an insulator. The turns of wire in a coil can also create a capacitor because between each turn of wire there are two conductors separated by an insulator, which can be air, enamel, ceramic, etc. When the right frequency is applied to the inductor, the inter-turn capacitance can create a resonant circuit. This inter-turn capacitance only happens with AC and not DC because inductors are a short with DC.

Figure 1:
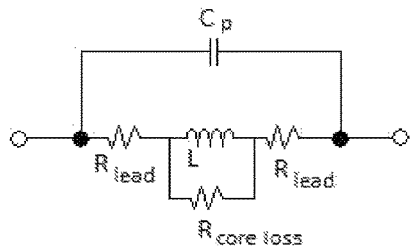
FIG. 1: The parasitic capacitance that exists across the windings of an inductor.

FIG. 1 shows the parasitic capacitance that exists across the windings of an inductor.

The Non-Ideal Inductor

In general, inductors are more problematic than capacitors. The parasitic elements are:
1) resistance within the leads and the wire of the inductor,
2) capacitance between the leads and between the loops of wire, and
3) the equivalent resistance corresponding to core losses (if the inductor uses a ferromagnetic core).

DETAILED DESCRIPTION

As stated above, Faraday's Law governs induction in the motion of a closed current-bearing conducting loop through a magnetic field. This law only applies simply (without geometrical modification) with regard to the motion of such a loop across the field lines of a uniform magnetic field.

In a typical generator or motor, multiple loops are in close proximity to one another and are rotating through the stator magnetic field or are placed on salient generator coils. The net induced magnetic fields produced around each current-bearing wire produces a negative effect according to Lenz's law which states that "when an EMF (voltage) is generated by a change in magnetic flux according to Faraday's Law, the polarity of the induced EMF is such that it produces a current (when the coil is connected to a load) whose induced magnetic field polarity opposes the change which produces it." The induced magnetic field inside any loop of wire always acts to try to keep the magnetic flux through the loop constant. The attached appendix gives a pertinent explanation, of Faraday's Law.

Conventional Coil Operation with an Approaching Magnetic North Pole

As a magnetic North pole approaches a coil, its magnetic field intersecting with the coil increases and causes an electromotive force ('EMF' or voltage) to be induced across the coil, in accordance with Faraday's Law and Lenz's Law, as given by Equation (1.1), where we take advantage of the fact that since flux $\Phi B$ for a coil is given by $\Phi B = NAB\perp$ where $B\perp$ represents magnetic field perpendicular to the coil and the number of turns of the coil N and perpendicular area A remain constant, to obtain the second form given $$\varepsilon = -d\Phi B/dt = -NAd/B\perp dt \quad (1.1)$$

Figure 6A:
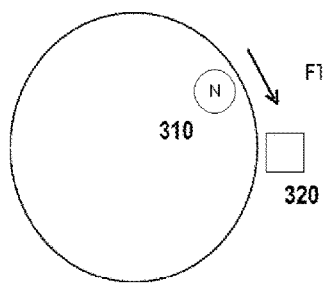
FIG. 6a: A rotating North Pole magnet field approaching a stationary coil which is connected to a load at a certain frequency $F_1$.
Figure 6B:
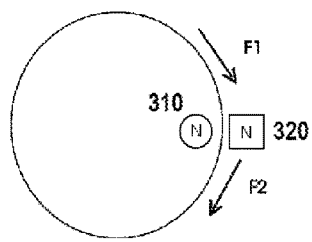
FIG. 6b: Rotor Magnetic Field at TDC and Approach and Departure Frequencies of Rotor Magnet.

This EMF in turn causes an electric current to flow through any load connected across the coil as well as through the coil windings 310, as shown in FIG. 6b. A ferrous core placed coaxially in the coil acts to concentrate, magnify, resist (core hysteresis, reluctance) and guide the flux through the centre of the coil.

In accordance with Lenz's Law, the induced EMF acts to resist the change in magnetic field in the Coil, and hence the current flowing in the coil acts so as to attempt to make the end of the coil nearest to the approaching magnet a magnetic North pole [as is indicated by the '−' sign in Equation (1.1) and illustrated in FIG. 6b]. This induced EMF continues to be generated (along with its associated current) until the magnet is at its minimum distance from the centre of the core (TDC). It is worth noting at this point that the present convention for the design of coils for use in generators is that their internal DC resistance is minimized (through using wire of a relatively large diameter) with the aim of minimizing Joule-heating losses in them.

Joule-heating is a function of current flow duty cycle and the duty cycle of a conventional coil is 100%, or a full 360 degrees of the sine wave with the slightest exception at TDC when the current stops briefly only to resume flowing in the opposite direction. The ReGen-X coil avoids Joule-heating problems because, when operated above the critical minimum frequency, the ReGen-X coil current flow duty cycle is restricted only to the small moment at TDC and the coil has time to cool over the remainder of the duty cycle.

Conventional Coil Operation with a Receding Magnetic North Pole

As the magnetic North pole 715 passes its minimum distance from the centre of the core and starts to recede from the coil, its magnetic field intersecting with the coil decreases and again causes an electromotive force ('EMF') to be induced across the coil, in accordance with Faraday's Law and Lenz's Law, as given by Equation (1.1). This EMF in turn causes an electric current to flow through any load connected across the coil as shown in FIG. 7.

Figure 7:
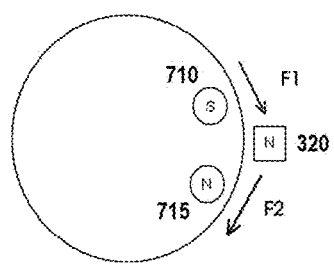
FIG. 7: Discharging Delayed Regenx Coil's Induced Magnetic Field Accelerating Rotor's North Pole Magnetic Field While Attracting the Approaching South Pole Magnetic Field.
Figure 8A:
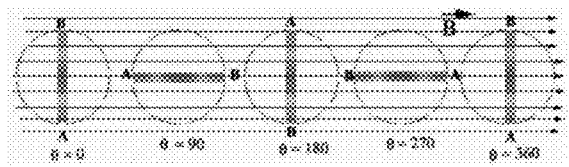
FIG. 8: 8a, b, c, d Examples of Rotating Coil Loop in a Uniform Magnetic Field
Figure 8B:
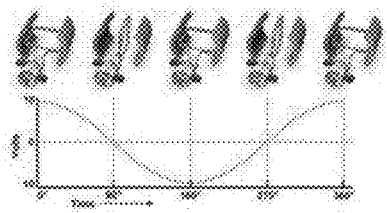
Figure 8C:
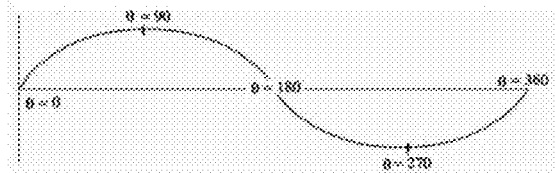
Figure 8D:
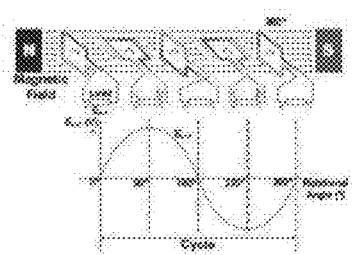

In accordance with Lenz's Law, the induced EMF once more acts to resist the change in magnetic field in the coil, and hence the current flowing in the coil acts so as to attempt to make the end of the coil nearest to the approaching magnet a magnetic South pole 710 [as is indicated by the '−' sign in Equation (1.1) and illustrated in FIG. 7]. This means that the current flows through the coil in the opposite direction to that shown in FIG. 6b.

This process continues while the next pole on the rotor (a magnetic South pole) approaches (the coil's core and is resisted in its attempt to do so) its minimum distance from the centre of the core, and then the current reverses once more until a North pole is at the minimum distance position. This process is continually repeated in the conventional coil whereby the conventional coil's direction of current flow is always producing an externally-induced magnetic field around the coil which resists the rotor magnet's departure from the coil while simultaneously resisting the opposite pole's approach with an infinitesimally small respite at TDC when the current direction changes.

ReGen-X COIL Construction

In comparison to the conventional coil design which employs large gauge windings with the aim of minimizing resistive losses within the coil (q.v.) the ReGen-X coil can use relatively small gauge wire, and this leads to many more turns being used in a ReGen-X coil than in a conventional coil. A consequence of this design characteristic is to raise the inductance of the coil so that above a certain frequency the current flow is delayed until TDC while the self-induced capacitance is increased. The high inductance, high impedance, high DC resistance variant of the ReGen-X coil produces a large repelling magnetic field and useful increases of kinetic energy and motive force into the system but they do not deliver much useable electrical energy because it is primarily consumed by the high DC resistance of the coil itself.

The same "acceleration under load" effects can be achieved equally well by employing the bi-filar coils as previously described without requiring small gauge wire, or a large turns ratio. This IP variation provides large additions of positive motive force/kinetic energy into the system with useable electrical power being delivered to a load.

At a certain critical excitation frequency $\omega_c$ the reactance of the coil due to its:
1. Inductance $X_L$ becomes relatively large in magnitude; and,
2. Mutual capacitance between turns, $X_c$, becomes relatively small in magnitude.

The capacitance between individual wire turns of the coil, called parasitic capacitance, does not cause energy losses but can change the behavior of the coil. Each turn of the coil is at a slightly different potential, so the electric field between neighbouring turns stores charge on the wire, so the coil acts as if it has a capacitor in parallel with it. At a high enough frequency this capacitance can resonate with the inductance of the coil forming a tuned circuit, causing the coil to become self-resonant.

For example, an inductor often acts as though it includes a parallel capacitor, because of its closely spaced windings. When a potential difference exists across the coil, wires lying adjacent to each other at different potentials are affected by each other's electric field. They act like the plates of a capacitor, and store charge. Any change in the voltage across the coil requires extra current to charge and discharge these small 'capacitors'. When the voltage changes only slowly, as in low-frequency circuits, the extra current is usually negligible, but when the voltage changes quickly the extra current is larger and can be significant.

The inventor's proposition is that this means (for all practical purposes) that once being excited at a frequency of above $\omega_c$ the coil ceases to function as an inductor and begins to function as a capacitor.

The excitation frequency of the coil $\omega e$ is a function of the number of pole pairs $n_p$ and the angular velocity of the rotor $\omega_r$ as shown in Equation (2.1).

$$\omega_e = n_p \omega_r \quad (2.1)$$

While $\omega_e$ is of the same order as $\omega_c$ or less, the ReGen-X coil operates in substantially the same manner as a conventional coil. Above $\omega_c$ however, carefully considering the rate of change of magnetic flux in the core is the key to understanding the operation of the coil.

The coil of the present invention operates at a higher frequency than conventional coils, with coils of higher inductance and, in some embodiments, employs parallel wound series connected bi-filar windings which increase coil impedance and self-induced capacitance by 200% or more.

Above a certain critical minimum frequency the ReGen-X coil does not allow current to flow through the coil or the load until TDC. In doing so, the ReGen-X coil delays the repelling magnetic field normally produced by the coil until the rotor magnetic field is already moving away from TDC. A good mechanical analogy would be an air compressor blowing air into a balloon. Like a magnetic or electric field, pressure, being a per-unit area force, does not represent energy until it is exerted over a distance and otherwise may be regarded as potential energy. As long as the inflow pressure exceeds the air pressure being built up inside the balloon, the balloon will continue to inflate. At TDC, or any transition points 90, 180, 270 and 360 degrees, (see FIG. 5) the inflow pressure is instantly reversed and the balloon's stored air pressure is released in the same direction as the air compressor's forced air direction and the net air force equals the balloon's stored potential+the potential delivered by the compressor.

The "air pressure" being stored inside the balloon corresponds to voltage potential stored inside the generator coil. The "compressor" corresponds to the prime mover causing the rotor magnet to move toward the coil thus inducing an electromotive pressure in the coil. If, however, the pump's inflow pressure ceases the air pressure inside the balloon will begin to deflate the balloon. The only difference between the conventional coil and the ReGen-X coil is that the ReGen-X coil balloon scenario is actually a vacuum which sucks the air out of the air compressor into the balloon without any back pressure and less work being required by the compressor to deliver air into the balloon and then releases it, and then sucking it in again. The conventional coil (balloon) is always fighting the compressor—and as the pressure (voltage) builds inside the balloon (coil) more and more work is required to be delivered by the compressor.

Figure 2A:
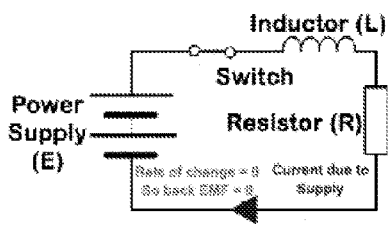
FIG. 2: 2a,b The Time Constant Rise Time in a Series Inductor Circuit. The ReGenX coil's inductance contributes to the coils rise time post TDC which in turn contributes to the 45 degree current time delay.
Figure 2B:
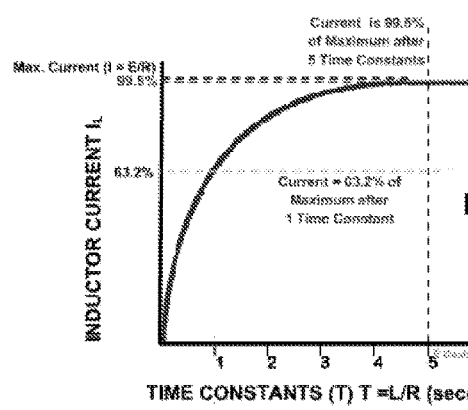

It is worth noting again that at TDC in a conventional coil there is no relative motion between the generator's rotor magnets and the coil, and there is no induced voltage in the coil or current flow at the instant the current is changing direction, but due to the rise and decay time constants of the inductor coil it is not noticeable because the coil's time constant prevents the current from instantly decaying down to zero. FIG. 2 shows the Time Constant Rise Time in a Series Inductor Circuit. The ReGenX coil's inductance contributes to the coils rise time post TDC which in turn contributes to the 45 degree current time delay.

An inductor (also choke, coil or reactor) is a passive two-terminal electrical component that stores energy in its magnetic field. For comparison, a capacitor stores energy in an electric field, and a resistor does not store energy but rather dissipates energy as heat. Any conductor has inductance. An inductor is typically made of a wire or other conductor wound into a coil, to increase the magnetic field.

When the current flowing through an inductor changes it creates a time-varying magnetic field inside the coil, a voltage is induced, according to Faraday's law of electromagnetic induction, which by Lenz's law opposes the change in current that created it. Inductors are one of the basic components used in electronics where current and voltage change with time, due to the ability of inductors to delay and reshape alternating currents.

Inductance (L) results from the magnetic field forming around a current-carrying conductor. Electric current through the conductor creates a magnetic flux proportional to the current. A change in this current creates a corresponding change in magnetic flux which, in turn, by Faraday's law generates an electromotive force (EMF) in the conductor that opposes this change in current. Thus inductors oppose changes in current through them and the higher the inductance value the longer the coil takes to allow current to flow in the circuit. Conventional generator coils employ coils of low inductance whereas the ReGen-X coil has inductance values and time constants that can be five times greater. This has an important role to play in the coils ability to allow current to flow through the coil.

The effect of an inductor in a circuit is to oppose changes in current through it by developing a voltage across it proportional to the rate of change of the current. The relationship between the time-varying voltage v(t) across an inductor with inductance L and the time-varying current i(t) passing through it is described by the differential equation:

$$v(t) = L\frac{di(t)}{dt}$$

When there is a sinusoidal alternating current (AC) through an inductor, a sinusoidal voltage is induced. The amplitude of the voltage is proportional to the product of the amplitude ($I_p$) of the current and the frequency (f) of the current.

$$i(t) = I_p \sin(2\pi ft)$$

$$\frac{di(t)}{dt} = 2\pi f I_p \cos(2\pi ft)$$

$$v(t) = 2\pi f L I_p \cos(2\pi ft)$$

In this situation, the phase of the current lags that of the voltage by $\pi/2$.

If an inductor is connected to a direct current source with value I via a resistance R, (see FIG. 2a) and then the current source is short-circuited, the differential relationship above shows that the current through the inductor will discharge with an exponential decay:

$$i(t) = Ie^{-(R/L)t}$$

The delay in the rise/fall time (FIG. 2b) of the circuit is in this case caused by the back-EMF from the inductor which, as the current flowing through it tries to change, prevents the current (and hence the voltage across the resistor) from rising or falling much faster than the time-constant of the circuit. Since all wires have some self-inductance and resistance, all circuits have a time constant. As a result, when the power supply is switched on, the current does not instantaneously reach its steady-state value v/R. The rise instead takes several time-constants to complete. At TDC the coil is neither approaching nor receding from the stationary coil, therefore f=0 and coil total impedance $Z_t$=coil DC resistance $R_{DC}$ (only). No $X_L$ (inductive reactance) component exists because it is frequency dependent.

ReGen-X Coil Operation Above Critical Frequency with an Approaching Magnetic North Pole The situation as a magnetic North pole approaches the Regen-X coil with a speed that means $$\omega_e >> \omega_c$$

In this situation the magnetic flux in the core has a relatively high, positive rate of change and this means that because the inductance of the ReGen-X coil is relatively high the reactance of the coil is also high ($X_L = \omega_L = 2\pi fL$) leading to a high overall impedance ($Z_{coil} = X_L + R_{DC} + X_c$) and so there is a relatively low current flow in the coil and load. Instead, the majority of the energy contained in the magnetic field in the core/coil combination ($W = LI^2/2$) remains in the core. (Where the usual circuit variable names are used; f:frequency, L:inductance, I:current, R:resistance, subscripting i.e. 'DC' means zero-frequency etc.)

Coil Operation Above Critical Frequency with a Coaxial Magnetic North Pole

Figure 9:
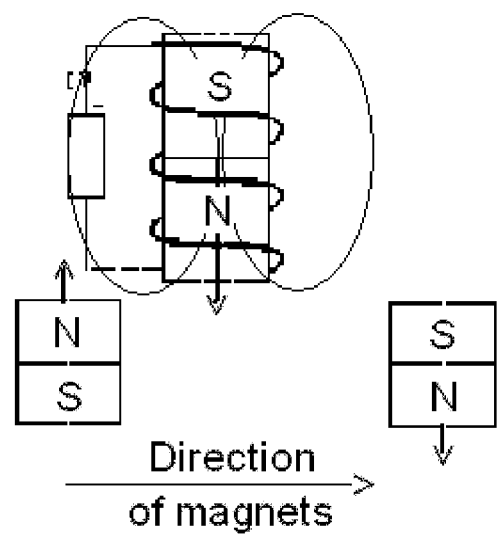
FIG. 9: Stage 1 Conventional Generator Coil North Pole Magnetic Field Approaching Coil

At the instant the magnet is coaxial with the coil the situation is as illustrated in FIG. 9. Because the rate of change of the magnetic flux is instantaneously zero, the impedance of the coil drops rapidly and magnetic field in the core is 'discharged' back towards the rotor, repelling the passing North magnetic pole and attracting the next South magnetic pole in the series. It is postulated by the inventor that in this situation Lenz's law applies in the opposite sense and so the EMF generated by the coil is defined by Equation (2.2).

$$\varepsilon_{Regen-X} = +d\Phi B/dt = +NAdB\perp/dt \qquad (2.2)$$

At TDC there is no horizontal motion and no vertical motion as far as the coil is concerned. At TDC there is no relative motion thus no changing flux inside the coil core because it is already maximum. At TDC just prior to the rotor magnet beginning to move away from the stationary coil the maximum coil-induced voltage can then be dissipated through the low DC resistance of the coil, producing a maximum repelling magnetic field which accelerates the rotor magnet's departure while simultaneously attracting the opposite pole rotor magnetic field now moving into position. At $TDC+T_1$ (location of rotating "N" in FIG. 3) f, or the reactive oscillation in the coil, exists again. Flux change is uniform if RPM is uniform—there is no maximum change in flux. However flux magnitude increases as the rotor magnet approaches the stationary core and it peaks at TDC. At TDC flux magnitude is maximum inside the coil core. Coil-induced voltage is also maximum.

The drawings (see FIG. 2) show that the induced flux predominates below the critical minimum frequency $\omega_c$ resulting in a single sinusoidal wave in the equivalent circuit. Above $\omega_c$, the coil produces an AC pulse at TDC (See FIG. 2b) which is very narrow but still a sine wave. On the rotor of the present invention, the alternating magnet poles are virtually touching each other for maximum frequency and the frequency at TDC, i.e. neither approaching nor receding. There is no relative movement so the frequency must be zero if no movement exists.

In order to reduce the amount of energy required to rotate the rotor and, therefore, reduce the amount of energy required to generate electric power, the distortion of the magnetic flux across the pole faces must be eliminated or at least reduced. In fact the present invention does not directly reduce or eliminate it, but instead reverses it by delaying it by 180 degrees.

FIG. 6a shows a rotating North Pole magnet field approaching a stationary coil which is connected to a load at a certain frequency $F_1$. In this condition a conventional generator coil will decelerate the rotor magnets speed of approach and reduce the frequency of the coil's induced current. Initially when the ReGenX coil is connected to a load, current flows in the coil but it is delayed by 45 degrees so the full repelling forces as dictated by Lenz's Law and Newton's Third Law are not manifested—as shown in the oscilloscope shots in FIG. 5.

Figure 5:
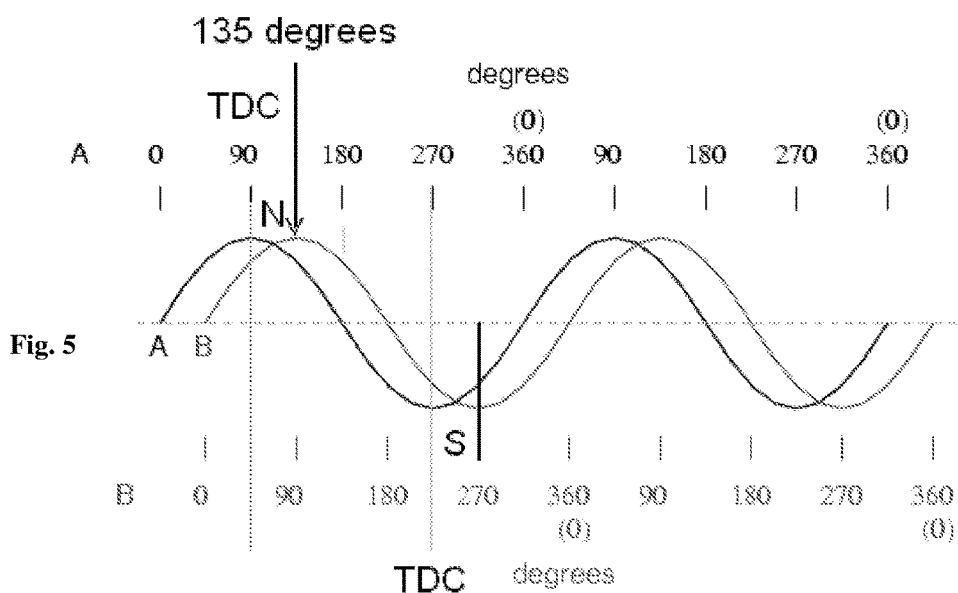
FIG. 5: The oscilloscope current waveform through a purely resistive load (PF=1) for a conventional generator coil (A) and a ReGenX coil (B) with the same rotor magnet and identical rotor magnet relative positioning.

FIG. 5 shows the oscilloscope current waveform through a purely resistive load (PF=1) for a conventional generator coil (A) and a ReGenX coil (B) with the same rotor magnet and identical rotor magnet relative positioning. At 90 degrees (TDC) the rotor magnet is Top Dead Centre to both the conventional and ReGenX coil's core and is just about to move past the coil's cores. The conventional coil is experiencing the maximum repelling resistive force as can be exerted by the conventional coil's induced magnetic field because the current magnitude is also maximum. At TDC the ReGenX coil's stored voltage is released through the coil and the load and the coil's Time Constant delays its immediate manifestation. The ReGenX coil's current is delayed by 45 degrees and does not fully manifest itself until the 135 degree mark which is post TDC.

At post TDC (post 90 degrees) the rotor's rotating magnetic field has already moved past the coil's cores and when the delayed current finally peaks at the 135 degree mark the ReGenX coil's repelling magnetic field also peaks. The result is the rotor magnet's departure away from the ReGenX coil's core is accelerated by the forces exerted by the ReGenX coil's current magnitude and resultant induced magnetic field on the rotor's magnetic field. The current frequency is increased from F1 to F2 as shown in FIG. 6b as is the rotor's speed and the mechanical power in the generator's drive shaft.

The ReGenX generator coil attracts the approaching South Pole rotor magnetic field while simultaneously repelling the rotor's North Pole magnetic field as it moves away from TDC. F1 and F2 can also be looked at as the resultant externally applied forces required to move the rotor magnet toward and away from the coil's core. In a conventional generator coil scenario the externally applied mechanical energy must be increased to compensate and overcome the resistive repelling forces the generator coil applies on the approaching rotor magnetic field (F1) and the attracting forces as the rotor magnetic field tries to move away. In the ReGenX generator coil operation the externally applied mechanical force can be reduced in proportion to the attracting force (F1) and repelling force (F2). As can be seen from the various diagrams in FIGS. 8a, 8b, 8c and 8d, TDC can occur at 0, 90, 180 or 270 degrees depending on where the sine wave is triggered on the oscilloscope. In every case, at TDC the rotating loop is parallel to the generator stator's magnetic lines of force.

Conventional Generator Coil Operation, Stage 1 and Stage 2

FIG. 9 shows what happens when a North Pole rotor magnet approaches a conventional coil which is connected to a load, current flows to the load and the coil produces both a repelling resistive electromagnetic force as seen by the approaching rotor magnet as well as an attractive resistive electromagnetic field as seen by the receding magnetic field. The net effect is more externally applied force must always be applied to the rotor magnets to keep them approaching the coil or they will decelerate and eventually stop if the load current is great enough. The higher the current magnitude flowing in the coil the stronger the coil's induced magnetic field and the more force must be applied to the rotor.

Figure 10:
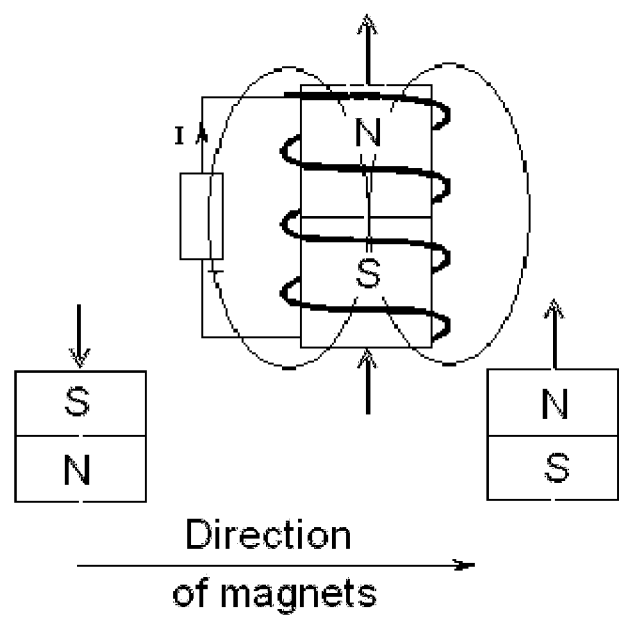
FIG. 10: Stage 2 Conventional Generator Coil North Pole Magnet Receding From Coil

When the North Pole rotor magnetic field begins to move away from the coil's core as shown in FIG. 10, the current flow direction changes direction as well and the coil's induced resistive magnetic field changes from a repelling magnetic field to an attracting magnetic field which resists the North Pole rotor's departure.

ReGen-X Generator Coil Operation, Stage 1, Stage 2 and Stage 3

Figure 11:
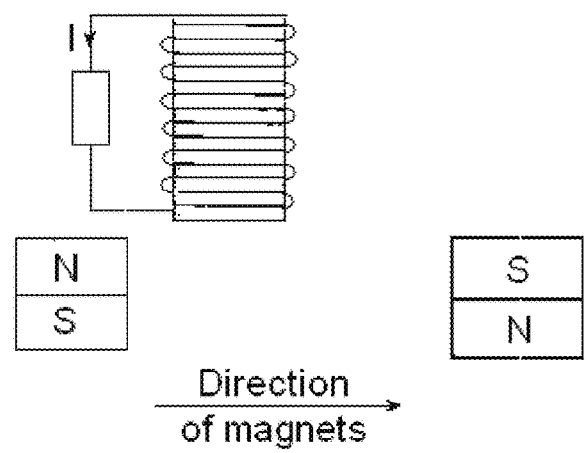
FIG. 11: Stage 1 ReGenX Generator Coil, North Pole Magnet Approaching Coil

In Stage 1 as shown in FIG. 11, when the rotor's magnet field approaches the ReGen-X coil above a certain critical minimum frequency the coil impedance delays current flow in the coil and it does not peak until the rotor magnet passes TDC. TDC is the point in time when the rotor magnet is neither approaching nor receding the coil and it is essentially stationary. FIG. 5 shows the current sine wave in the ReGenX coil (B) which is minimal prior to TDC and maximum after TDC. When the rotor magnetic field approaches a ReGenX coil above the coil's critical minimum frequency the current is delayed and the resultant repelling magnetic field is minimal as shown in the isolation diagram below FIG. 12.

Figure 12:
FIG. 12: Isolation Oscilloscope Shot Showing ReGenX Coil Current 45 Degree Delay
Figure 13:
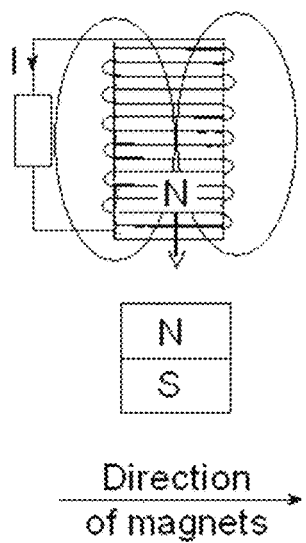
FIG. 13: Stage 2 ReGenX Generator Coil North Pole Magnet Receding From Coil

FIG. 12 shows the current sine wave for a conventional generator coil (A) which peaks at the 90 degree mark (TDC). The resistive repelling magnetic field produced by the coil increases in magnitude until it peaks at 90 degrees and then changes direction to a maximum magnitude resistive attracting magnetic field after the 90 degree mark when the current flow in the coil also changes direction. The current flowing in the ReGenX generator coil on the other hand is small prior to the 90 degree mark and does not peak until after TDC or until the rotor magnet is already moving away from the coil's core. The NET result is the post 90 degree (accelerative) repelling forces are greater than the pre 90 degree (decelerative) repelling forces exerted by the ReGenX coil's induced magnetic field on the rotor's rotating magnetic field and rotor acceleration occurs under load. FIG. 13 shows Stage 2 for the ReGenX generator coil when the rotor magnetic field is TDC, neither approaching nor receding from the coil's core.

At TDC the impedance of the coil drops to the low DC resistance of the coil while the induced voltage in the coil is at a maximum. The maximum induced voltage can now be dissipated through the coil's low DC resistance which produces maximum current flow through the coil and to the load. The ReGenX coil's current flow is delayed by the coil's inductance rise time as shown in FIG. 2. and maximum current flow and corresponding maximum magnetic field produced around the coil does not fully manifest itself until 45 degrees post TDC. Once the rotor's magnetic field begins to move away from the coil's core at TDC the ReGenX coil's delayed and peaking magnetic field repels and accelerates the rotor magnetic field in the same direction as its original trajectory and accelerates its departure away from the coil at a faster rate than it otherwise would be.

Figure 14:
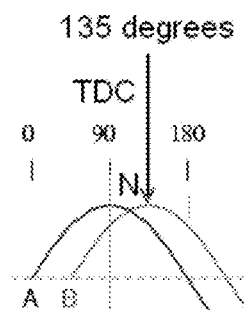
FIG. 14: Isolation Oscilloscope Shot Showing ReGenX Coil Current 135 Degree Delay
Figure 15:
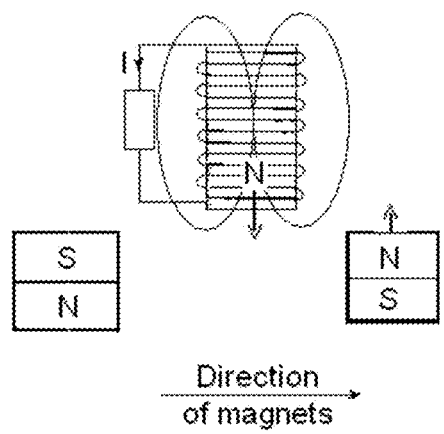
FIG. 15: Stage 3 ReGenX Generator Coil, North Pole Rotor Magnetic Field Being Accelerated Away From Coil's Core Post TDC and South Pole Rotor Magnet Being Accelerated Toward ReGenX Coil's Core

FIGS. 14 & 15 show Stage 3 for the ReGenX coil operation where the rotor's rotating magnetic field has moved past the coils core at TDC. When the ReGen-X coil discharges its delayed magnetic field which is the same polarity as the receding rotor magnet it accelerates the magnet's departure at a faster rate while simultaneously attracting the opposite pole on the rotor which is now moving into position. The net effect is less externally applied force can be applied to the rotor magnets to keep them approaching the coil as opposed to a conventional generator coil which requires an increase in eternally applied force. The higher the current magnitude flowing in the ReGen-X coil the stronger the coil's induced magnetic field and the less force is required to keep the rotor rotating and the generator producing electrical energy.

Coil Positioning with Regards to Flux Harvesting with a Plurality of Salient RegenX Generator Coils and or Conventional Generator Coils The ReGenX generator coil has the unique ability to convert rotor magnetic flux to electrical energy as well as discharging magnetic flux from an adjacent ReGenX or conventional generator coil and or motor coil. When a ReGenX generator coil is placed in the vicinity of another ReGenX generator coil and the first ReGenX coil is connected to a load, the induced voltage in the second coil will be increased by a certain amount because the first coil's induced magnetic field is being discharged and entering the second ReGenX coil in the same magnetic direction. The effect is that the net flux penetrating the second coil's core will be increased according to the magnitude of the magnetic coupling coefficient between the two coils and vice versa.

When the second ReGenX coil is placed on load, the power delivered to the load by the first coil will be increased due to the flux harvesting feature of the ReGenX generator coil. If a conventional generator coil replaces the second coil in the scenario above the same effect will occur. If a motor coil replaces the second coil the motor coil's flux will be collected in the first ReGenX generator coil as dictated by the magnetic coupling coefficient between the two coils.

Figure 16:
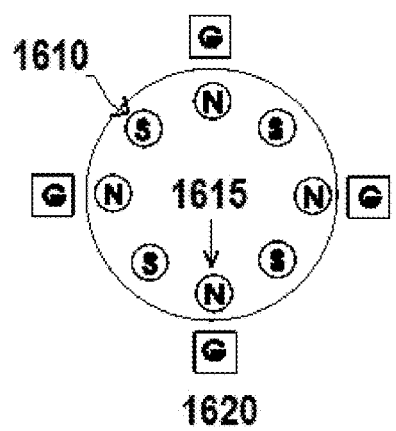
FIG. 16: Shows the relative positioning between ReGenX generator coils to maximize Flux Harvesting.
Figure 17:
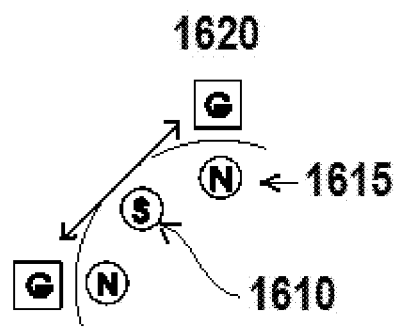
FIG. 17: Flux Harvesting Between Two Coils
Figure 18:
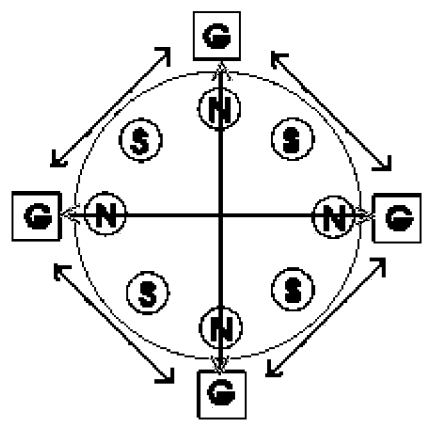
FIG. 18: Flux Harvesting Between Four ReGenX Coils
Figure 19:
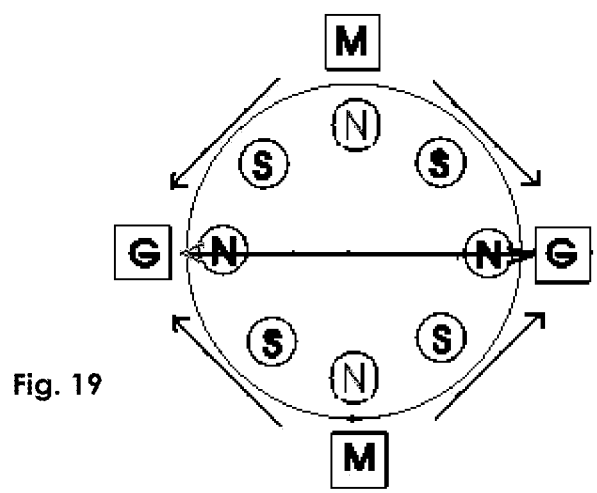
FIG. 19: Flux Harvesting Example of Flux Directions With Regard to Discharging Motor Flux and Rotor Flux Generator Direction and Regen-X Core Penetration Direction with Salient Coils

FIG. 16 shows the relative positioning between ReGenX generator coils 1610 & 1615 to maximize Flux Harvesting.

When the motor coils 1620, as shown in FIGS. 16-19 receive electric current in the correct direction, the current creates a magnetic field around the motor coil with a North pole polarity 1910 which causes the North Pole rotor magnets to accelerate away from the motor coils. When the ReGen-X coils discharge their stored electro-magnetic-energy into the load which is physically connected to them, they also create a magnetic field around the coil which has the same polarity as the already receding North pole rotor magnet.

The adjacent ReGen-X coil's discharging flux is also collected in all the available ReGen-X coils and vice versa. The discharging flux from the motor coils (M) enters the ReGen-X generator coil in the same direction as the North pole rotor flux, and the two flux magnitudes are additive. The ReGen-X coil's electrical power output to the load is increased by the magnitude of the motor flux which is collected in the ReGen-X coil's core.

Figure 20:
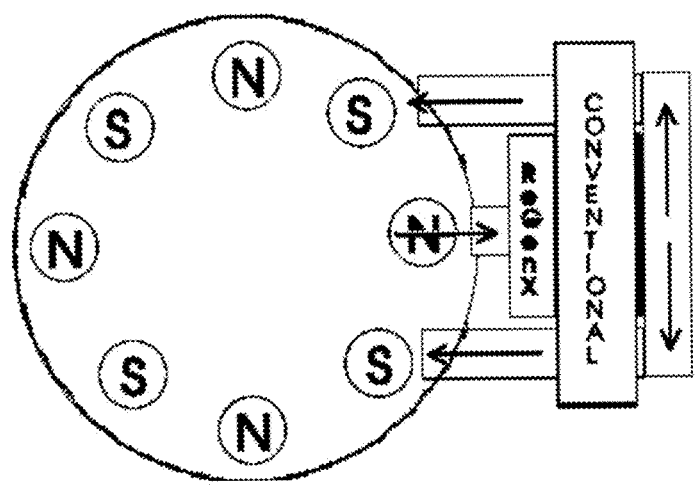
FIG. 20: Flux Harvesting Employing A Concentric E Core on No Load

FIG. 20 shows a Concentric E core with a ReGen-X salient coil mounted on the middle finger of an E core, with a conventional coil wrapped around the ReGen-X coil on the outer E core fingers. The conventional coil in this embodiment is used to supply power to a load while creating conventional armature reaction. Rotor flux enters the E core via the North pole rotor magnet on the middle E core finger and returns to the rotors' South poles via the outer E core fingers. The flux directions are reversed when the South pole rotor magnet is facing the E core's middle finger.

Figure 21:
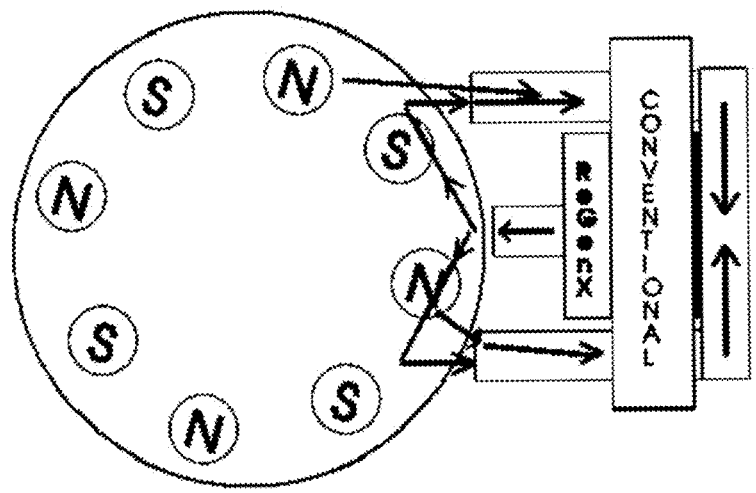
FIG. 21: shows a Concentric E core with a ReGen-X salient coil mounted on the middle finger of the E core, with a conventional coil wrapped around the ReGen-X coil on the outer E core fingers.

FIG. 21 shows a Concentric E core with a ReGen-X salient coil mounted on the middle finger of the E core, with a conventional coil wrapped around the ReGen-X coil on the outer E core fingers. When the ReGen-X coil discharges its stored flux, it accelerates the North pole magnet's departure while attracting the approaching South pole magnet on the rotor, and the rotor is accelerated. A receding South pole rotor magnet produces the same flux direction in the core as an approaching North pole rotor magnet. The discharging North pole flux from the ReGen-X coil enters the external coil fingers of the E coil in the same direction as the approaching rotor magnet flux, and all the fluxes are additive. The output power delivered by the conventional coil to the load is increased by the net magnitude of flux produced by the ReGen-X coil and that collected by the conventional coil. The conventional coil in FIG. 21 can be substituted for a motor coil or vice versa while retaining the flux harvesting features described in FIGS. 20 and 21.

Figure 22:
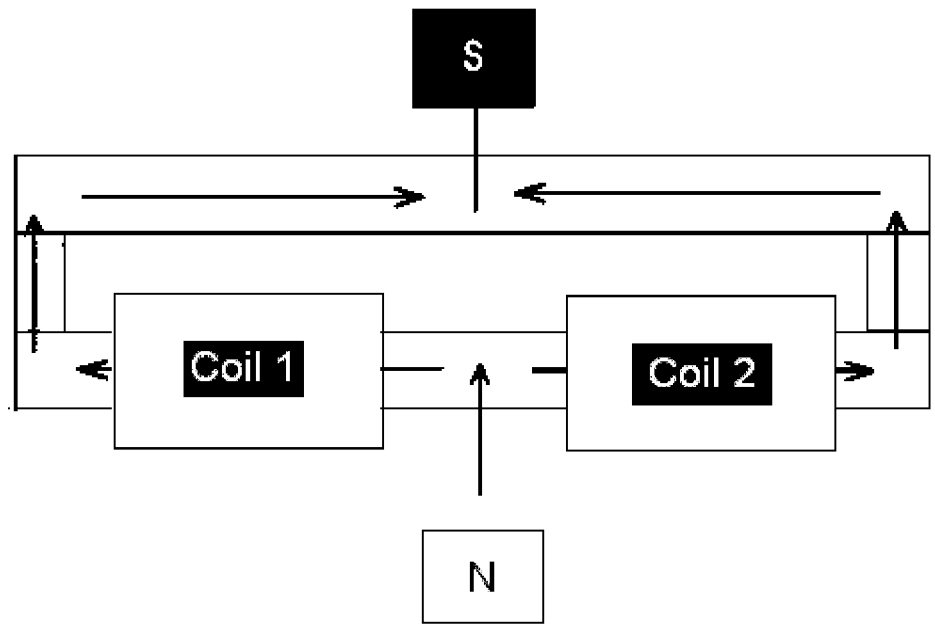
FIG. 22: shows the rotor flux paths for a ReGen-X Toroid Core application on no load.

FIG. 22 shows the rotor flux paths for a ReGen-X Toroid Core application on no load.

Figure 23:
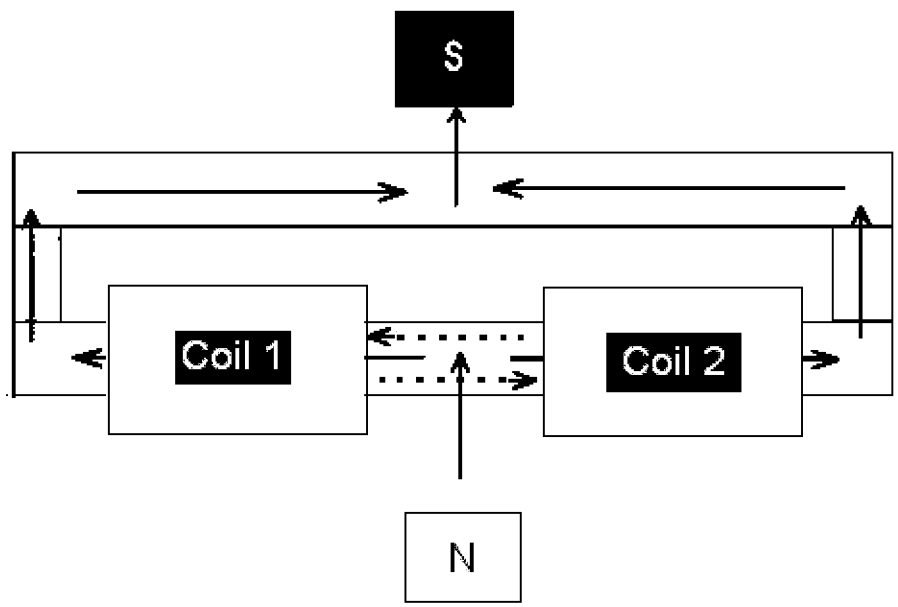
FIG. 23: Bi-Coil Toriod Core ReGenX Generator Coils On Load
Figure 24:
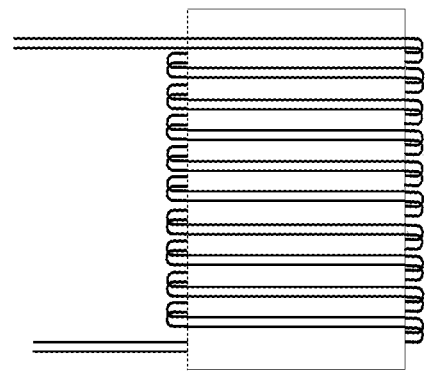
FIG. 24: Bi-Filar Wound Coil
Figure 25:
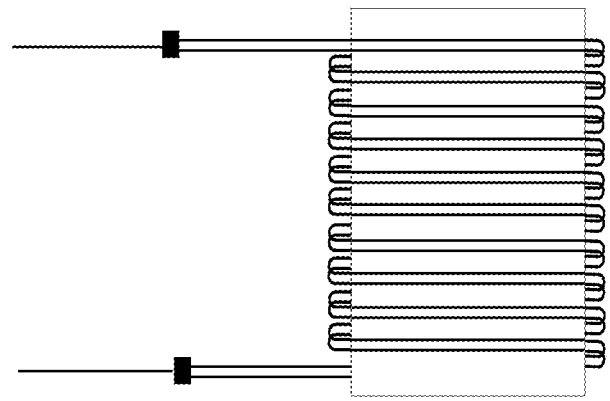
FIG. 25: Bi-Filar Wound Parallel Connected Coil

FIG. 23 shows the ReGen-X coil induced flux paths for a ReGen-X Bi-coil Toroid Core application. The discharging flux (hash tag arrows) from coil 1 enters coil 2 in the same direction as the rotor flux path direction and vice versa. Because the induced fluxes are entering the coils in the same direction as the rotor flux, all the fluxes are cumulative and the output power to the load is increased accordingly.

Bi-Filar wound coil is created by winding two wires around the core simultaneously.

The parallel connected bi-filar winding is employed when the ReGen-X coil is to be used as a motor coil or a con-ventional generator coil because the inductive properties of this coil are identical to that of a conventionally wound coil.

Figure 26:
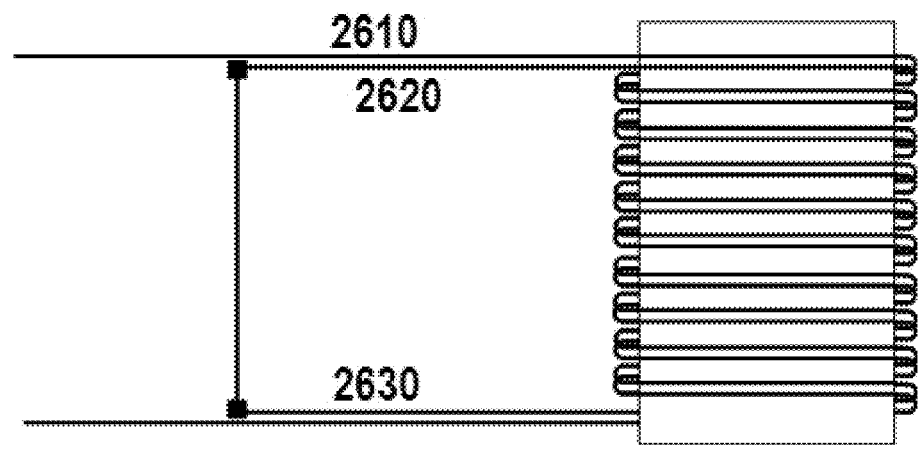
FIG. 26: Bi-Filar Wound Series Connected Coil

Connecting the bi-filar coil into a series wound coil increases the coil's self induced capacitance and changes the on-load characteristics (when operated above the minimum critical frequency) from a counter-electromotive-torque producing coil to a complementary-electromotive-torque producing coil which accelerates the system rather than decelerating it. FIG. 26 shows input wire A 2610, input wire B 2620 and output wire A 2630.

I claim:

1. A generator or motor coil for a rotating electrical machine having at least one magnet external to said coil, said coil comprising a winding of a plurality of turns of insulation-covered wire creating a coil magnetic field, said wire having a length, a gauge and a total DC resistance substantially proportional to the ratio of said length and said gauge, a DC current being conducted according to said total DC resistance,
   wherein;
      said rotating electrical machine has a rotational speed
      an EMF is produced along said wire, said EMF determined by said coil magnetic field and varying in time according to
      an AC cycle, a frequency of said AC cycle being proportional to said rotational speed
      said EMF varies according to proximity between said coil magnetic field and said at least one external magnet and wherein there exists a "top dead center" point at which said coil magnetic field is in closest proximity to a pole of said at least one external magnet;
      an inductive current exists along said wire, said inductive current being proportional to the ratio of said EMF and an inductive reactance of said coil and reaching a minimum just prior to said "top dead center" point
      a capacitive current exists along said wire, at least a portion of which is of a "parasitic" nature, conducting through said insulation and among at least a portion of said plurality of turns of wire, said capacitive current being proportional to the ratio of said EMF and a capacitive reactance of said coil and said capacitive current reaching a maximum just prior to said "top dead center" point;
   wherein the improvement comprises:
      the length of said wire is selected; and the gauge of said wire is selected to determine a DC resistance of said wire such that
   the maximum of said capacitive current is greater than the sum of said DC current and the minimum of said inductive current; and
   wherein the improvement further comprises that said DC resistance is not made so great as to significantly increase Joule heating.

2. The coil of claim 1 wherein:
   said electrical machine further comprises at least one additional magnet external to said coil, each magnet corresponding to a "top dead center" (TDC);
   said at least one additional magnet having a pole of opposite polarity to a pole of said first magnet
   said capacitive current is characterized by a self-induced capacitance;
   said wire gauge and length are selected according to a time constant, said time constant being substantially the ratio between said total DC-resistance and an inductance characterizing said inductive current; and
   an instantaneous force determined by said self-induced capacitance and wherein further, when operated at said predetermined rotational speed to, substantially immediately prior to reaching each said TDC, said coil disallows current to flow in the coil and store energy externally around the coil in the electromagnetic field as an inductor, but will force the coil to store useful energy internally in the electrostatic field capacitively for approximately the length of one said time constant until substantially the next moment of TDC wherein this maximum internally-stored energy is released as a magnetic field of identical polarity to said pole of opposite polarity with substantially its full said instantaneous force being exerted upon the magnet pole corresponding to said TDC.

3. The coil of claim 2 wherein the coil turns ratio is increased substantially in proportion to the decrease in said wire gauge.

4. The coil of claim 3 wherein the capacitive current is greater than the sum of said DC current and said inductive current by at least 1%.

5. The coil of claim 2 wherein at least a portion of said self-induced capacitance is achieved by employing bi-filar coils.

6. The coil of claim 4 wherein said inductance of the coil forms a tuned circuit with the capacitance of the coil causing it to become self-resonant.

7. The coil of claim 2 wherein the expiration of said time constant causes stored electrostatic energy to released to be exerted upon the stator magnet pole at substantially the 45 degree mark.

8. The coil of claim 5 further comprising different modes of operation which can be employed at any time and in combination with a plurality of coils via electronic or manual switching of different coil configurations.

9. The coil of claim 8 wherein said different modes of operation are selected from the list of
   i. Parallel wound, parallel connected bi-filar wound motor coil
   ii. Parallel wound, series connected bi-filar wound motor coil
   iii. Parallel wound, parallel connected bi-filar wound conventional (system decelerating) coil
   iv. Parallel wound, series connected bi-filar wound coil comprising said increased inductive reactance
   v. High Impedance coil.

10. The coil of claim 9 further comprising a step up or step down transformer.

11. The coil of claim 1 wherein, when operated as a plurality of salient or independent coils, subject to particular positioning of the coils, the discharging flux from said coil is collected into adjacent generator coils resulting in net additive flux in the coils, including the rotor flux plus the induced flux from other coils.

12. The coil of claim 2 wherein the impedance of the coil is in the range 1-10 OHM.

13. The coil of claim 2 wherein the impedance of the coil is in the range 10-100 OHM.

14. The coil of claim 2 wherein the impedance of the coil is in the range 100-1000 OHM.

15. The coil of claim 5 wherein said bi-filar windings increase coil impedance and self-induced capacitance in the range of 1-10%.

16. The coil of claim 5 wherein said bi-filar windings increase coil impedance and self-induced capacitance in the range of 10-100%.

17. The coil of claim 5 wherein said bi-filar windings increase coil impedance and self-induced capacitance in the range of 100-1000%.

18. The coil claim of 11 wherein at least one of said plurality of coils is a conventional motor coil.

19. The coil of claim 4 wherein the capacitive current is greater than the sum of said DC current and said inductive current in the range 1%-10%.

20. The coil of claim 19 wherein the capacitive current is greater than the sum of said DC current and said inductive current by at least 100%.

* * * * *